US012005713B2

(12) United States Patent
Yoshimune et al.

(10) Patent No.: US 12,005,713 B2
(45) Date of Patent: Jun. 11, 2024

(54) INKJET RECORDING APPARATUS

(71) Applicant: BROTHER KOGYO KABUSHIKI KAISHA, Nagoya (JP)

(72) Inventors: Hideaki Yoshimune, Nagoya (JP); Hikaru Tamura, Okazaki (JP); Akinari Ishibe, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 23 days.

(21) Appl. No.: 17/697,103

(22) Filed: Mar. 17, 2022

(65) Prior Publication Data

US 2022/0314630 A1 Oct. 6, 2022

(30) Foreign Application Priority Data

Apr. 1, 2021 (JP) ................................ 2021-062534

(51) Int. Cl.
*B41J 2/17* (2006.01)
*B41J 2/165* (2006.01)

(52) U.S. Cl.
CPC ......... *B41J 2/1721* (2013.01); *B41J 2/16523* (2013.01); *B41J 2002/1728* (2013.01)

(58) Field of Classification Search
CPC .................. B41J 2/1721; B41J 2/16523; B41J 2002/1728; B41J 2/16508; B41J 2/16511; B41J 2/16532; B41J 2/17513; B41J 2/1752; B41J 2/17553; B41J 2002/17573; B41J 2002/17576; B41J 2/17566; B41J 29/02; B41J 29/13; B41J 29/38; B41J 2/17509
USPC ............................................................ 347/36
See application file for complete search history.

(56) References Cited

U.S. PATENT DOCUMENTS

| | | | | |
|---|---|---|---|---|
| 5,966,155 | A * | 10/1999 | Pawlowski, Jr. | B41J 2/17509 347/85 |
| 2003/0184771 | A1* | 10/2003 | Yamamoto | H04N 1/00525 358/1.7 |
| 2004/0246283 | A1* | 12/2004 | Merz | B41J 2/17566 347/7 |
| 2007/0279465 | A1* | 12/2007 | Shindo | B41J 2/16523 347/89 |

(Continued)

FOREIGN PATENT DOCUMENTS

JP 2013056503 A 3/2013

*Primary Examiner* — Jason S Uhlenhake
*Assistant Examiner* — Alexander D Shenderov
(74) *Attorney, Agent, or Firm* — Scully, Scott, Murphy & Presser, P.C.

(57) ABSTRACT

A base board includes a board and a controller mounted on the board. A controller is configured to receive signals outputted from a first sensor and a second sensor. A recording head, a case, the first sensor, a maintenance unit, a waste liquid container, the second sensor, and the base board are arranged in an internal space of a housing. The base board has a flat surface extending in a first horizontal direction and in a second horizontal direction. A range occupied by the base board in a vertical direction overlaps each of a range occupied by the first sensor in the vertical direction and a range occupied by the second sensor in the vertical direction. The second horizontal direction is perpendicular to the first horizontal direction. The vertical direction is perpendicular to both the first horizontal direction and the second horizontal direction.

11 Claims, 11 Drawing Sheets

(56) References Cited

U.S. PATENT DOCUMENTS

| | | | | |
|---|---|---|---|---|
| 2010/0201724 | A1* | 8/2010 | Yamaguchi | B41J 2/52 347/30 |
| 2013/0063520 | A1* | 3/2013 | Muraki | B41J 2/1721 347/36 |

* cited by examiner

INKJET RECORDING APPARATUS

CROSS REFERENCE TO RELATED APPLICATIONS

This application claims priority from Japanese Patent Application No. 2021-062534 filed Apr. 1, 2021. The entire content of the priority application is incorporated herein by reference.

BACKGROUND

In an inkjet recording apparatus, a controller mounted on a base board controls each part. The controller controls ink ejection from nozzles of a recording head to a sheet when recording an image. As ink is consumed by the image recording, ink is supplied to the recording head from an ink reservoir.

SUMMARY

According to one aspect, this specification discloses an inkjet recording apparatus. The inkjet recording apparatus includes a housing, a recording head, a case, a first sensor, a maintenance unit, a waste liquid container, a second sensor, and a base board. The housing has an internal space. The recording head has an ejection port configured to eject ink. The case is configured to accommodate an ink container storing ink to be supplied to the recording head. The first sensor is configured to detect ink stored in the ink container. The maintenance unit is configured to cause the recording head to discharge ink from the ejection port. The waste liquid container is configured to store ink discharged by the maintenance unit. The second sensor is configured to detect ink in the waste liquid container. The base board includes a board and a controller mounted on the board. The controller is configured to receive signals outputted from the first sensor and the second sensor. The recording head, the case, the first sensor, the maintenance unit, the waste liquid container, the second sensor, and the base board are arranged in the internal space of the housing. The base board has a flat surface extending in a first horizontal direction and in a second horizontal direction. A range occupied by the base board in a vertical direction overlaps each of a range occupied by the first sensor in the vertical direction and a range occupied by the second sensor in the vertical direction. The second horizontal direction is perpendicular to the first horizontal direction. The vertical direction is perpendicular to both the first horizontal direction and the second horizontal direction.

According to the above configuration, the inkjet recording apparatus is downsized.

BRIEF DESCRIPTION OF THE DRAWINGS

Embodiments in accordance with this disclosure will be described in detail with reference to the following figures wherein.

DETAILED DESCRIPTION

The controller controls a maintenance unit during maintenance. In the maintenance unit, a pump sucks ink from the recording head as waste liquid and sends the ink to a waste liquid reservoir through a waste liquid tube. The waste liquid reservoir has a waste liquid absorber inside a housing of the waste liquid reservoir, and has a waste liquid detector outside the housing. The waste liquid detector is electrically connected to the controller by an electric wire, and outputs a signal indicating the amount of waste liquid stored in the absorber to the controller through the electric wire. The controller notifies a user about a replacement timing of the waste liquid absorber and so on, based on the output signal of the waste liquid detector.

The ink reservoir generally has a residual amount detector outside the housing.

The residual amount detector outputs a signal indicating the amount of ink in the housing to the controller. The controller notifies the user about the replacement timing of the ink reservoir, ink replenishment timing, and so on, based on the output signal of the residual amount detector.

In a case where the heights of the base board, the waste liquid detector and the residual amount detector are different from one another, each wiring connecting the controller and each of the waste liquid detector and the residual amount detector occupies a large space. As a result, the inkjet recording apparatus becomes large.

In view of the foregoing, an aspect of an object of this disclosure is to reduce a size of an inkjet recording apparatus.

Hereinafter, a printer 100 according to an embodiment will be described in detail.

Figure 1A:
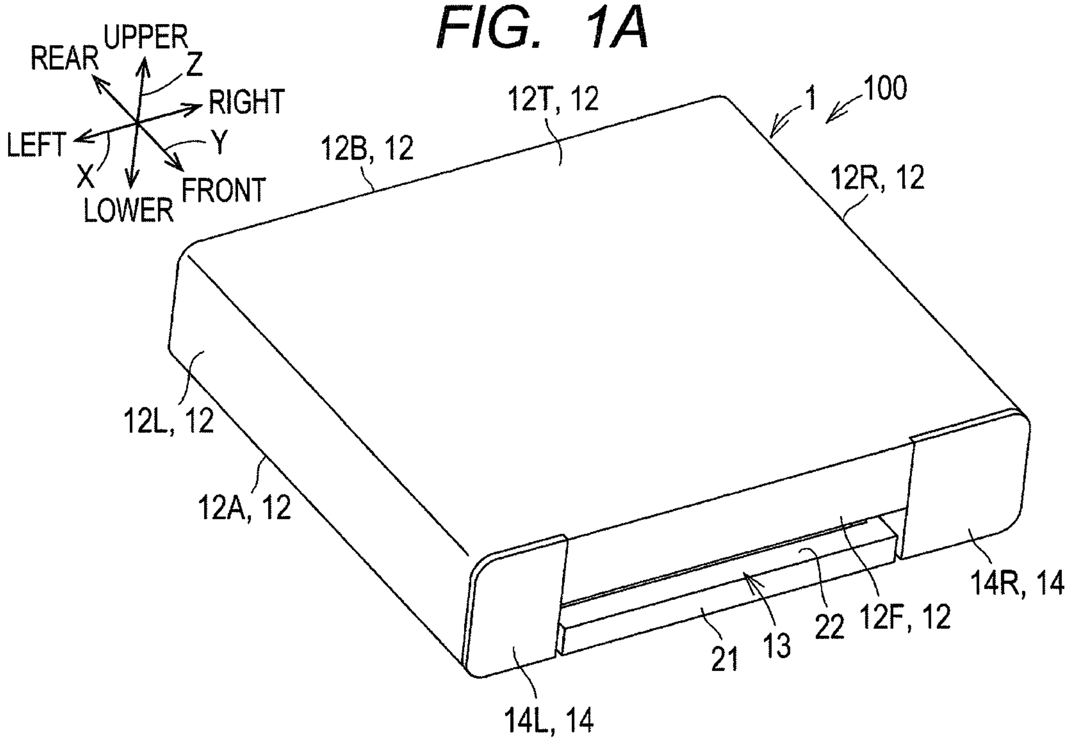
FIGS. 1A and 1B are external perspective views of a printer.
Figure 1B:
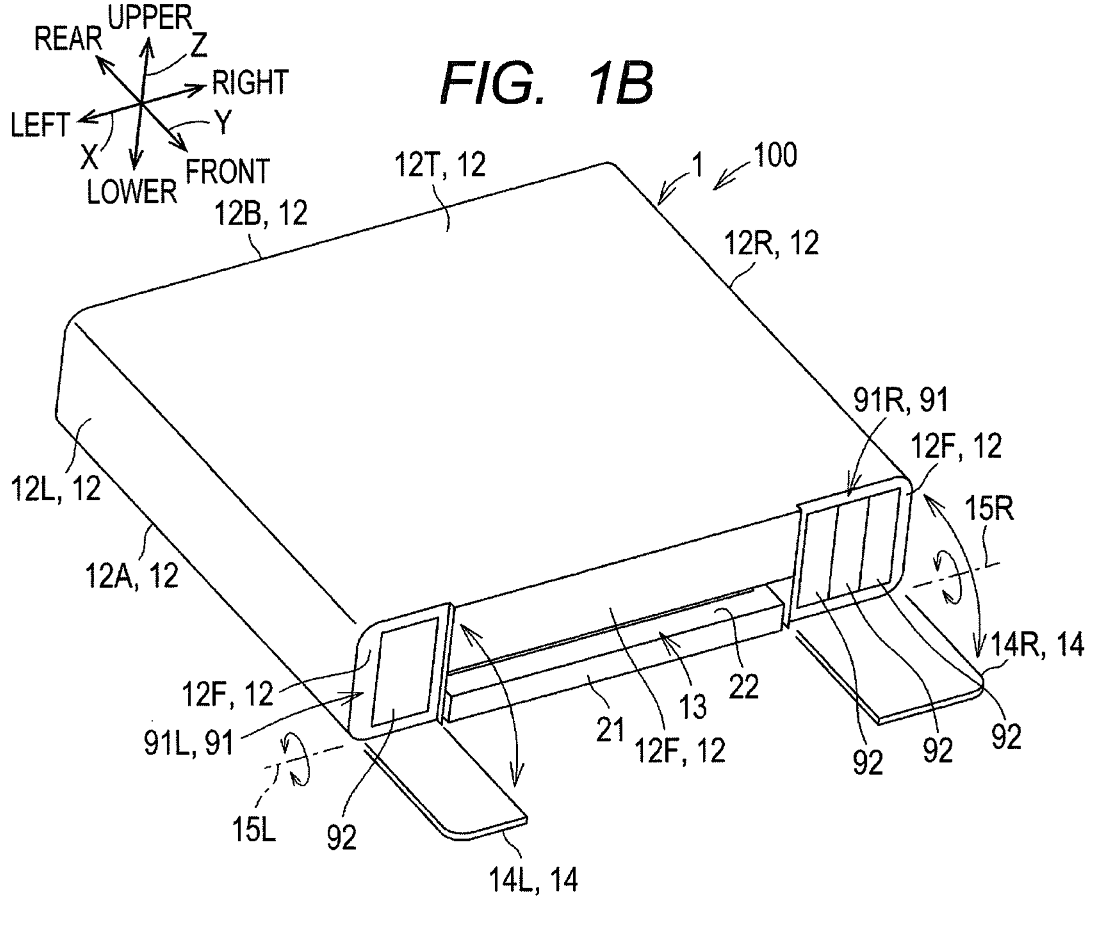

In each figure and the following description, a vertical direction Z is defined in a state in which the printer 100 is installed to be usable (the state in FIGS. 1A and 1B). A front-rear direction Y is defined such that the side of the printer 100 where an opening (discharge opening) 13 is provided is the front. A left-right direction X is defined when the printer 100 is viewed from the front. The front-rear direction Y is an example of a first horizontal direction. The left-right direction X is an example of a second horizontal direction perpendicular to the first horizontal direction.

Figure 5:
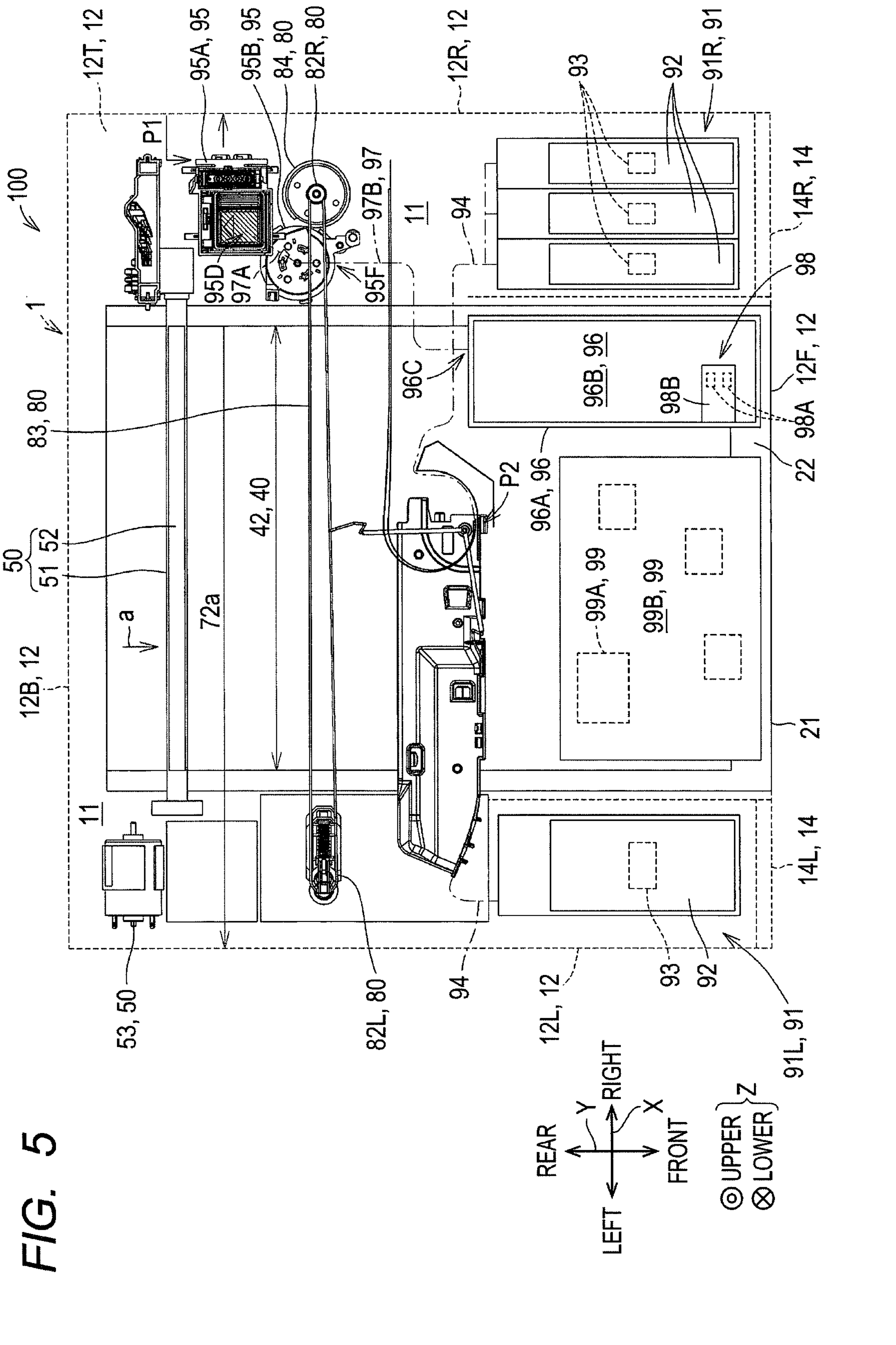
FIG. 5 is a plan view showing a state in which guide rails and so on are removed from the relevant parts shown in FIG. 4.

In the following description, “within range” or “include” first means that both ends of a member constituting the printer 100 in a particular direction are inside both ends of another member constituting the printer 100 in the same direction. The "within range" or "include" secondly means that both ends of a member constituting the printer 100 in a particular direction are inside both ends of the space in the printer 100 in the same direction. For example, as shown in FIG. 5, the range occupied by a pump 95B in the left-right direction X is included in the range occupied by the space between a cap 95A and a waste liquid unit (an example of a waste liquid container) 96. In this case, the right end of the pump 95B is located farther leftward than the right end of the cap 95A, and the left end of the pump 95B is located farther rightward than the left end of the waste liquid unit 96.

[Printer 100]

In FIGS. 1A and 1B, the printer 100 is an example of an image recording apparatus, and has a printing function. The printer 100 records an image on a sheet S (see FIG. 2) such as paper or an OHP sheet by an inkjet method. The printer 100 includes a substantially rectangular parallelepiped housing 1. The image recording apparatus may be a multifunction peripheral having a scanning function and/or a facsimile function in addition to the printing function, instead of the printer 100.

[Housing 1]

Figure 3:
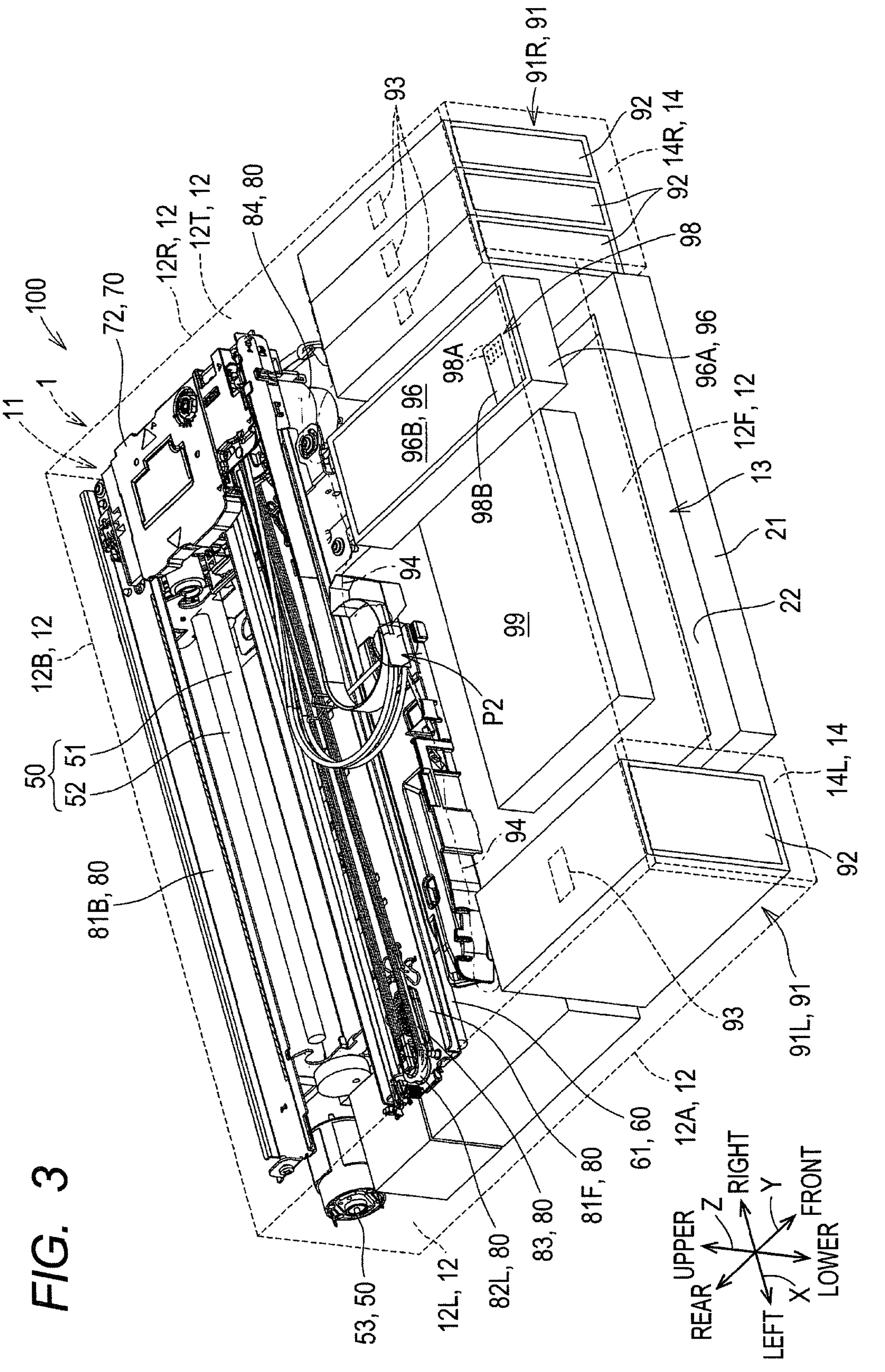
FIG. 3 is a perspective view showing the layout of the relevant parts in the housing.
Figure 4:
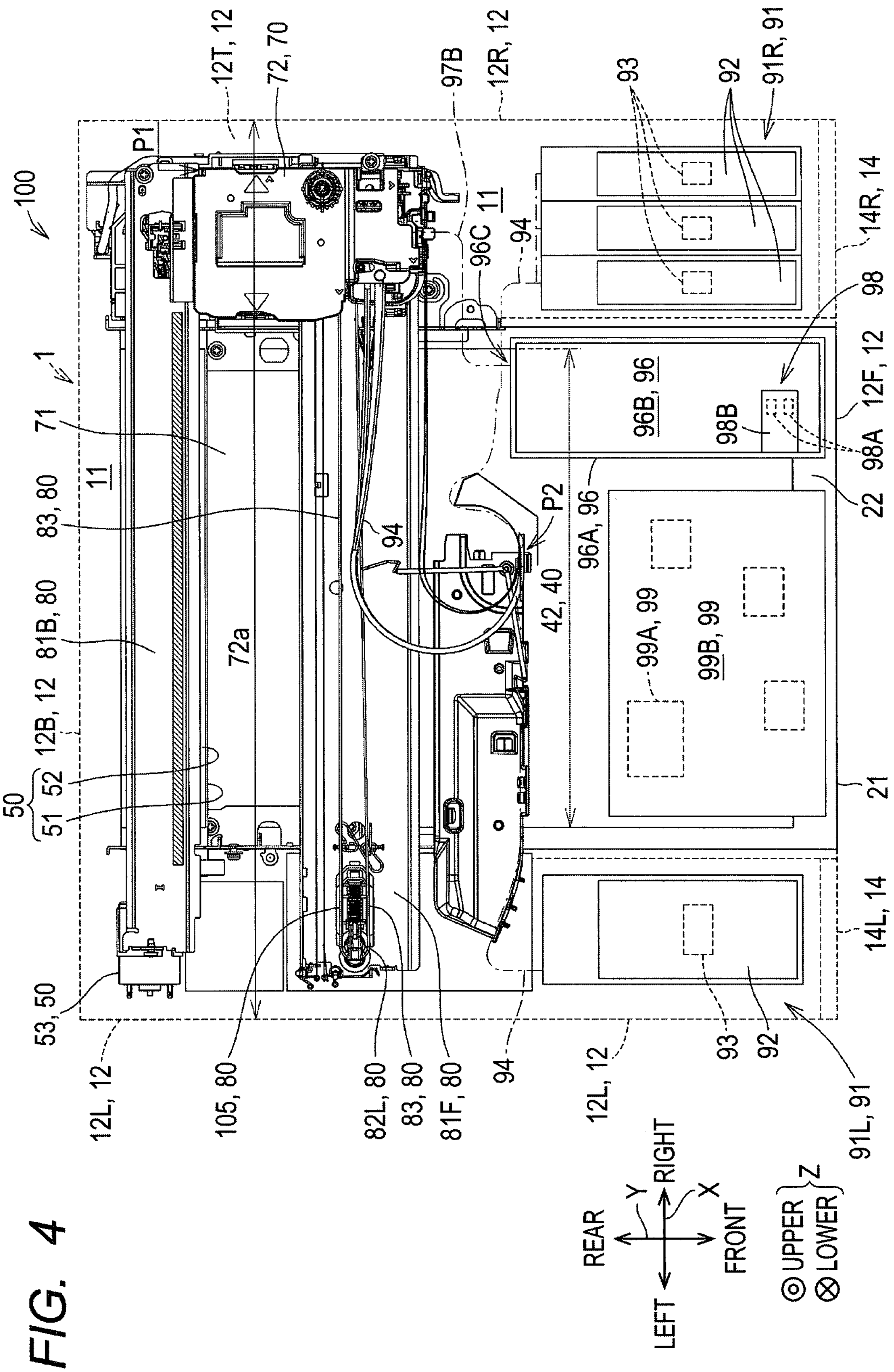
FIG. 4 is a plan view showing the layout of the relevant parts in the housing.

In FIGS. 1A and 1B, the housing 1 defines an internal space 11 of the printer 100 (see FIG. 2 and so on) from the outside, by a plurality of outer walls 12. The plurality of outer walls 12 include a bottom wall 12A, a top wall 12T, a front wall 12F, a rear wall 12B, a left wall 12L and a right wall 12R. In FIGS. 3 to 5, the outline of the housing 1 is shown by broken lines.

The bottom wall 12A and the top wall 12T are separated from each other in the vertical direction Z. Each of the bottom wall 12A and the top wall 12T is approximately rectangular in a plan view, and extends in the front-rear direction and the left-right direction.

The front wall 12F extends in the vertical direction and the left-right direction, and is connected to each front end of the bottom wall 12A and the top wall 12T. The vicinity of the lower end of the front wall 12F is the opening 13 facing forward. The left end and the right end of the opening 13 are located closer to the center (that is, inside) in the left-right direction than the left wall 12L and right wall 12R are. The shape of the opening 13 is a rectangle elongated in the left-right direction X when viewed from the front.

An operation panel may be arranged at the front wall 12F above the opening 13. The operation panel includes a plurality of operation buttons and a display, and is operated by a user.

The rear wall 12B, the left wall 12L, and the right wall 12R close (cover) the rear end, the left end, and the right end of the housing 1, respectively. The front wall 12F is an example of one end of the housing in the first horizontal direction. The rear wall 12B is an example of an other end of the housing in the first horizontal direction.

Figure 2:
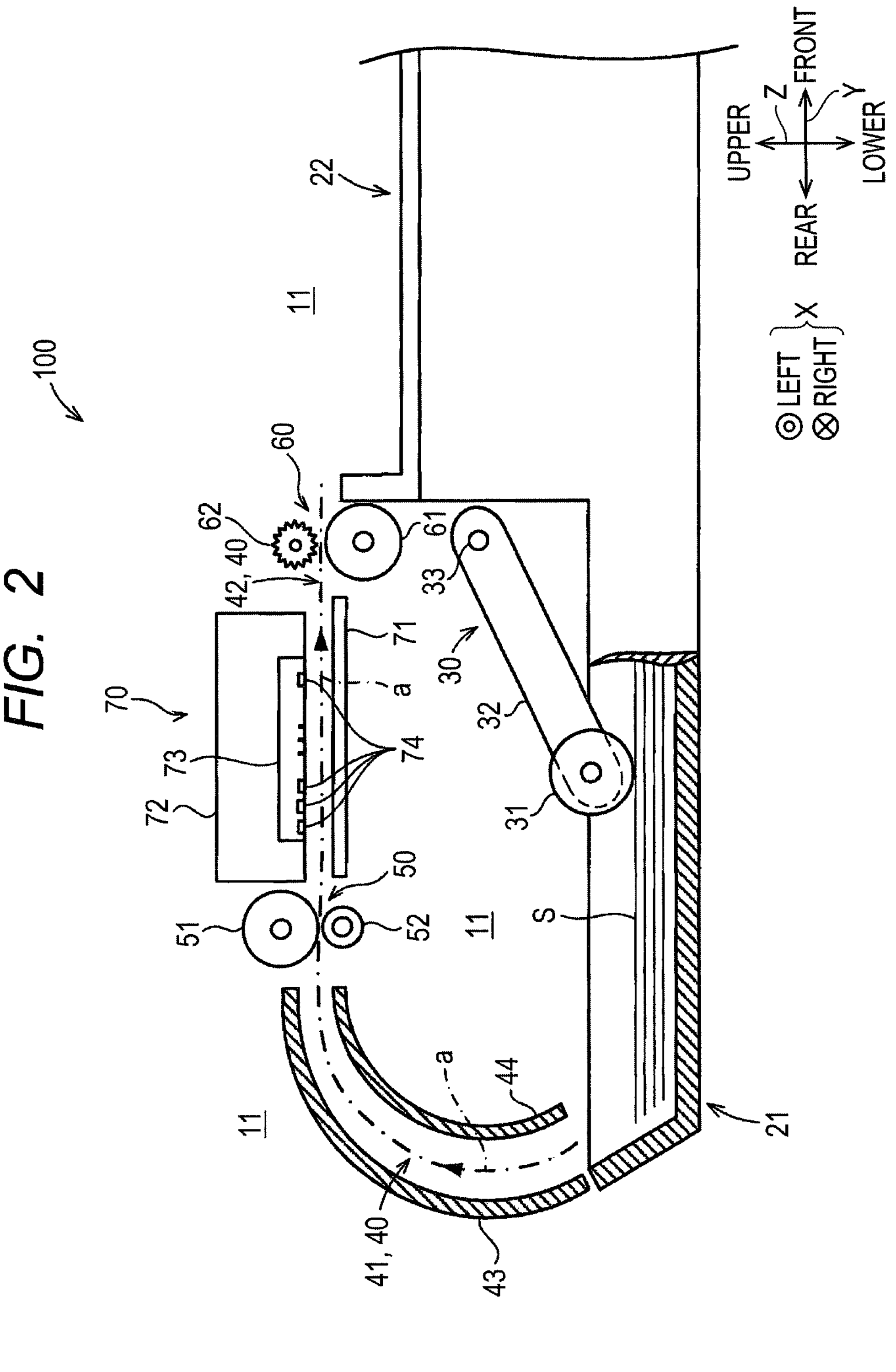
FIG. 2 is a schematic diagram showing a configuration in a housing of the printer.

In FIG. 2, in the internal space 11, a supply tray 21, a discharge tray 22, a feed mechanism 30, a conveyance path 40, a conveyance roller pair 50, a discharge roller pair 60, a recording unit 70, and a platen 71 are arranged as the main configurations of the printer 100.

[Supply Tray 21, Discharge Tray 22]

In FIGS. 1 and 2, the supply tray 21 is located in the internal space 11 through the opening 13. The supply tray 21 has a box shape which is thin in the vertical direction Z. The supply tray 21 supports a plurality of sheet S in a stacked state on its bottom wall.

The discharge tray 22 is located above the supply tray 21 and farther forward than the discharge roller pair 60, and supports the sheet S on which an image is recorded as a printed sheet. The user takes out the printed sheet on the discharge tray 22 through the opening 13.

[Feed Mechanism 30]

In FIG. 2, the feed mechanism 30 is located between the supply tray 21 and the platen 71 in the vertical direction Z. The feed mechanism 30 includes a feed roller 31 and a feed arm 32. The feed roller 31 is supported at the tip end of the feed arm 32 so as to be rotatable about its own axis. The base end of the feed arm 32 is located farther upward and forward than its own tip end. The feed arm 32 has a support shaft 33 at the base end. The feed arm 32 is rotatably supported by the housing 1 (see FIGS. 1A and 1B) so as to be pivotable in the circumferential direction of the support shaft 33. The feed roller 31 contacts the uppermost sheet S supported by the supply tray 21. The feed roller 31 is rotated by power from a motor 53 (see FIGS. 3 to 5). Thus, a rearward conveyance force is applied to the uppermost sheet S, and this sheet S is introduced to the upstream end of the conveyance path 40.

[Conveyance Path 40]

In FIG. 2, the conveyance path 40 is a so-called U-turn path, and has a curved portion 41 and a straight portion 42. The curved portion 41 extends upward while being curved from the rear end of the supply tray 21. The curved portion 41 extends forward near the top wall 12T (see FIGS. 1A and 1B). The curved portion 41 is defined by an outer guide member 43 and an inner guide member 44. The straight portion 42 is continuous with the downstream end of the curved portion 41, extends from the downstream end of the curved portion 41 in the front-rear direction and the left-right direction, and extends substantially linearly forward. The straight portion 42 reaches the rear end of the discharge tray 22. The upper side of the straight portion 42 is defined by the lower surface of the recording unit 70. The lower side of the straight portion 42 is defined by the upper surface of the platen 71.

The sheet S is conveyed in a conveyance direction "a" indicated by the arrow of the single-dot chain line at the conveyance path 40. In particular, in the curved portion 41, the sheet S is conveyed to the conveyance roller pair 50 while being guided mainly by the guide member 43. In the straight portion 42, the sheet S is conveyed by the rotating conveyance roller pair 50 and the rotating discharge roller pair 60 while being supported by the platen 71.

[Conveyance Roller Pair 50, Discharge Roller Pair 60]

In FIG. 2, the conveyance roller pair 50 and the discharge roller pair 60 convey the sheet S in the conveyance direction "a" along the conveyance path 40. The conveyance direction "a" is a forward direction at a portion downstream of the conveyance roller pair 50.

The conveyance roller pair 50 is located at the downstream end of the curved portion 41, and includes a drive roller 51 and a pinch roller 52. Each of the drive roller 51 and the pinch roller 52 extends in the left-right direction at a position closer to the rear wall 12B and the top wall 12T (see FIGS. 1A and 1B). The drive roller 51 and the pinch roller 52 contact each other at the upper and lower sides of the conveyance path 40 in the vertical direction Z. The drive roller 51 is rotated by the power from the motor 53. The pinch roller 52 rotates by following the rotation of the drive roller 51. The sheet S is nipped by the rotating conveyance roller pair 50 and conveyed in the conveyance direction "a".

In FIG. 2, the discharge roller pair 60 includes a drive roller 61 and a plurality of spurs 62. The drive roller 61 is located farther forward than the conveyance roller pair 50 in the front-rear direction Y and near the center of the housing 1 (see FIGS. 1A and 1B) in the front-rear direction Y. The drive roller 61 is located below the straight portion 42 in the vertical direction Z. The drive roller 61 extends in the left-right direction along the conveyance path 40, and is rotated by power from the motor 53 (see FIG. 3 and so on). The plurality of spurs 62 are arranged with intervals therebetween in the left-right direction, and contacts the drive roller 61 from above. Each spur 62 rotates by following the rotation of the drive roller 61. The sheet S is nipped by the rotating discharge roller pair 60, is conveyed in the conveyance direction "a", and discharged to the discharge tray 22.

In the embodiment, the drive rollers 51 and 61 and the feed roller 31 are rotated by the power of the motor 53. Alternatively, the drive rollers 51, 61 and the feed roller 31 may be rotated by the power of different motors. Further, at least two of the drive rollers 51, 61 and the feed roller 31 may be rotated by the power of the same motor.

[Recording Unit 70, Platen 71]

In FIG. 2, each of the recording unit 70 and the platen 71 is located between the conveyance roller pair 50 and the discharge roller pair 60 in the front-rear direction Y. The platen 71 has a support surface of the sheet S that extends in the front-rear direction and the left-right direction directly below the straight portion 42 in the vertical direction Z. The recording unit 70 is located above the conveyance path 40, and includes a carriage 72 and a recording head 73. The carriage 72 is configured to reciprocate in the left-right direction X above the platen 71 by the power supplied by a carriage conveyance mechanism 80 (see FIGS. 3 to 5). The recording head 73 is mounted on the lower side of the carriage 72. The recording head 73 has a plurality of ejection ports 74 on its lower surface.

The recording head 73 ejects ink stored therein from the plurality of ejection ports 74 while the carriage 72 moves, under the control of a controller 99A (see FIG. 4). With this operation, an image is recorded on the sheet S.

[Carriage Conveyance Mechanism 80]

In FIGS. 3 to 5, the printer 100 further includes a carriage conveyance mechanism (hereinafter, also referred to as "CR conveyance mechanism") 80 in the housing 1. The carriage conveyance mechanism 80 includes two guide rails (hereinafter, also simply referred to as "rails") 81B and 81F, two pulleys 82L and 82R, an endless belt 83, and a carriage motor (hereinafter, also referred to as "CR motor") 84. In FIG. 3, the pulley 82R is hidden by the carriage 72. In FIG. 4, the pulley 82R and the carriage motor 84 are hidden by the carriage 72. In FIG. 5, the rails 81B and 81F are not shown.

In FIG. 4, the rail 81B extends in the left-right direction at a farther upward and rearward position than the platen 71. The rail 81F extends in the left-right direction at a farther upward and forward position than the platen 71. The rails 81B and 81F are separated from each other with the platen 71 interposed therebetween in the front-rear direction Y. In FIGS. 3 and 4, the left and right ends of the rails 81B and 81F are located outside the left and right ends of the conveyance roller pair 50 in the left-right direction. The carriage 72 is bridged between the rails 81B and 81F.

In FIG. 5, each of the pulleys 82L and 82R is located within the range occupied by the rail 81F in the front-rear direction Y (see FIG. 4). The pulleys 82L and 82R are located outside the left and right ends of the straight portion 42 in the left-right direction X, respectively. The pulleys 82L and 82R are provided to protrude upward from the upper surface of the rail 81F, and are rotatable in the circumferential direction of the rotation axis extending along the vertical direction Z.

In FIG. 5, the endless belt 83 is wound around the pulleys 82L and 82R. As is clear from FIGS. 3 to 5, the carriage 72 is fixed at a position between the pulleys 82L and 82R at the endless belt 83.

As shown in FIG. 3, the carriage motor 84 is located near the right end of the rail 81F in the left-right direction X, slightly to the left of the right wall 12R, and below the rail 81F in the vertical direction Z. As shown in FIG. 5, the carriage motor 84 is located slightly forward of the cap 95A and rearward of a cartridge case 91R in the front-rear direction Y.

In FIG. 5, the carriage motor 84 is a DC motor with brush and so on, and has an output shaft directly connected to the rotation shaft of the pulley 82R. The output shaft of the carriage motor 84 is parallel to the vertical direction Z. The carriage motor 84 rotates under the control of the controller 99A, and generates power for rotating the pulley 82R on the output shaft. With this operation, the endless belt 83 moves in the left-right direction between the pulleys 82L and 82R, and the carriage 72 reciprocates in the left-right direction X within the range between the right wall 12R and the left wall 12L of the housing 1. In FIGS. 4 and 5, in a movement range 72*a* of the carriage 72, the position shifted to rightward from the straight portion 42 of the conveyance path 40 is defined as a capped position P1. The carriage 72 is capped by the cap 95A at the capped position P1.

[Internal Configuration of Housing 1]

In FIGS. 3 to 5, two cartridge cases (hereinafter, also referred to as "CTG case") 91, four ink cartridges (hereinafter, also referred to as "CTG") 92, four residual amount sensors 93, and four ink tubes 94 are located in the internal space 11. In FIGS. 3 to 5, the ink tubes 94 are shown by single-dot chain lines.

[Cartridge Case 91 (An Example of a Case)]

The two cartridge cases 91 are an example of cases in which the four cartridges 92 are accommodated. In the embodiment, the two cartridge cases 91 include a cartridge case 91L and the cartridge case 91R. In FIG. 3, each cartridge case 91 is located within a range from a position immediately rearward of the front wall 12F to a position separated forward from the rail 81F and the recording unit 70 in the front-rear direction Y. Each cartridge case 91 is located within a range from a position near the bottom wall 12A to a position near the top wall 12T in the upper-lower direction Z. The cartridge case 91R is located farther rightward than the feed tray 21, the discharge tray 22, and the conveyance path 40 in the left-right direction X. The right end position of the cartridge case 91R is the same as the right end position of the movement range of the carriage 72 or a position slightly toward the center in the left-right direction.

In FIGS. 1A, 1B and 6A, 6B, the cartridge case 91R is a box with a plurality of inner walls 911. The plurality of inner walls 911 includes a bottom wall 911A, a top wall 911T, a rear wall 911B, a left wall 911L, a right wall 911R, and two partition walls 911P and 911Q.

The bottom wall 911A and the top wall 911T are separated from each other in the upper-lower direction Z, and extend in the front-rear direction Y and in the left-right direction X. The rear wall 911B extends in the upper-lower direction Z and in the left-right direction X, and is continuous with the rear end of each of the bottom wall 911A and the top wall 911T. The left wall 911L and the right wall 911R are separated from each other in the left-right direction X, and extend in the front-rear direction Y and in the upper-lower direction Z. The partition walls 911P and 911Q are arranged between the left wall 911L and the right wall 911R at substantially equal intervals between the walls, and extend in the front-rear direction Y and in the upper-lower direction Z. Due to each inner wall 911, the cartridge case 91R is partitioned into three internal spaces 912. The front end of each internal space 912 is an opening facing forward. One cartridge 92 (specifically, cartridge 92B) is mounted and accommodated in each internal space 912 through the opening.

Figure 6A:
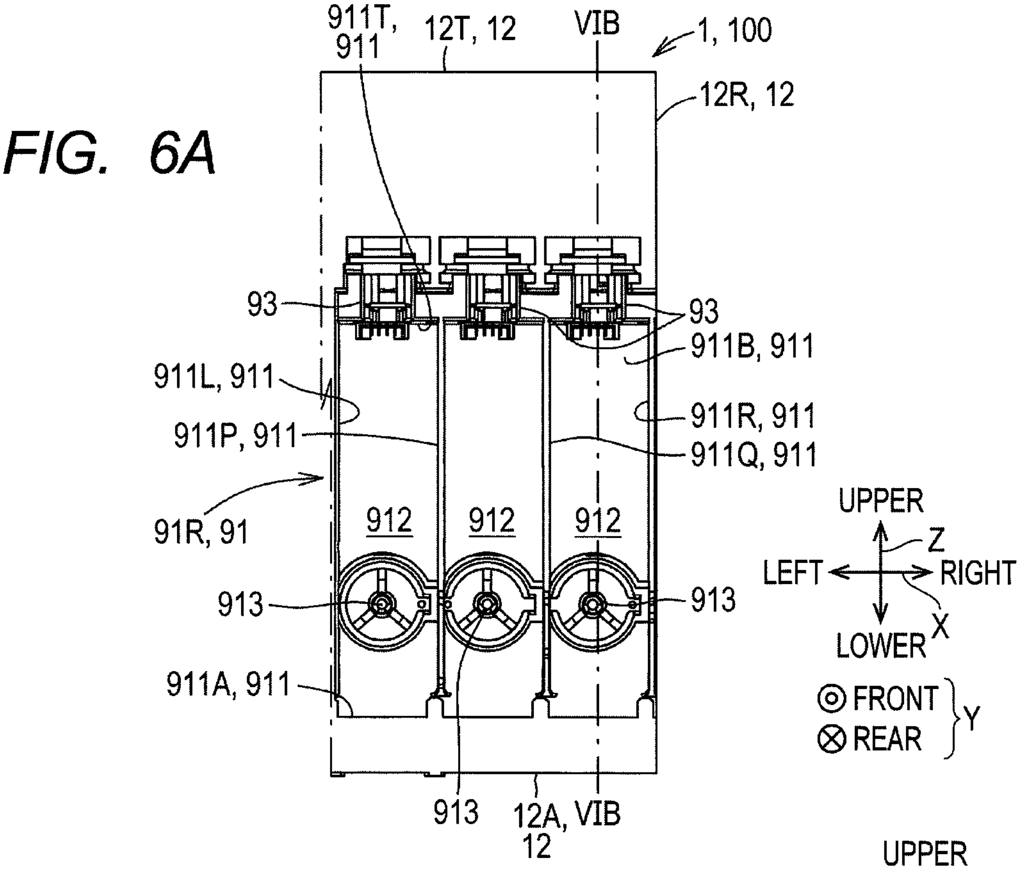
FIG. 6A is a front view of a cartridge case.
Figure 6B:
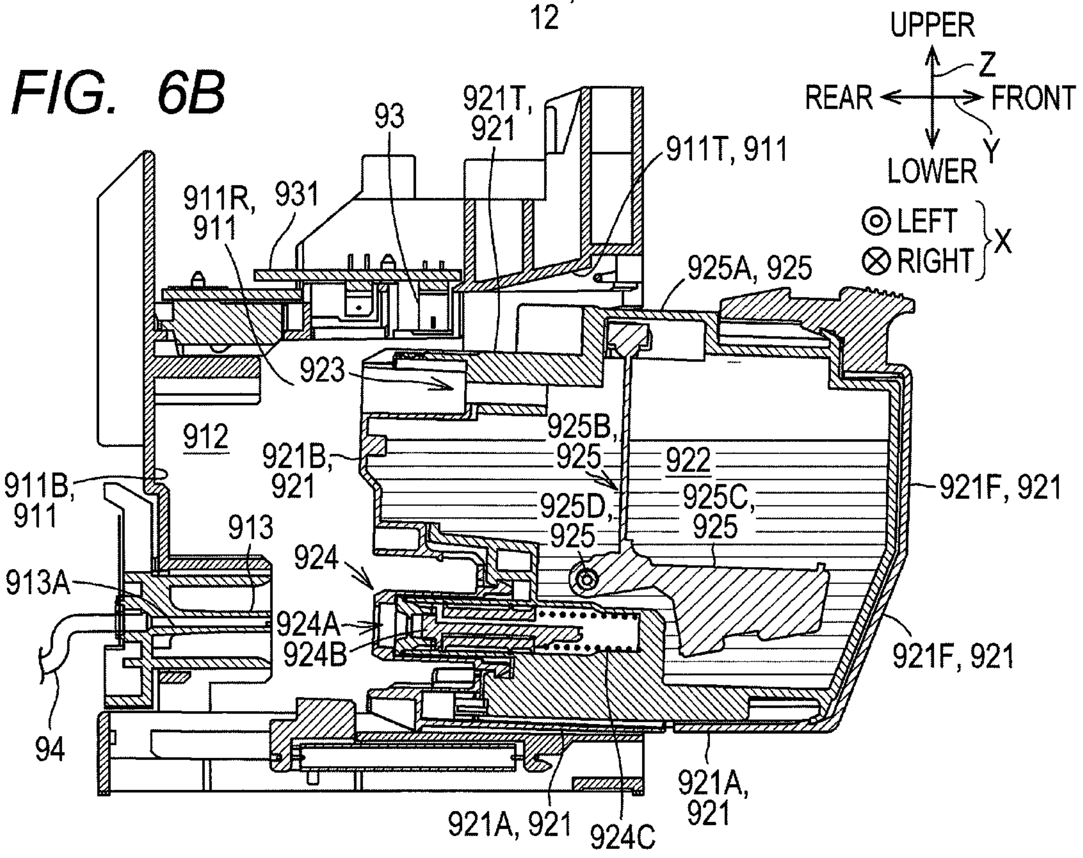
FIG. 6B is a cross-sectional view of a vertical cross section along a line VIB-VIB of FIG. 6A when viewed from the left.

In FIGS. 6A and 6B, the cartridge case 91R includes one ink needle (hereinafter also simply referred to as "needle") 913 in each internal space 912. Each needle 913 extends forward from a center position in the left-right direction X near the lower end of the rear wall 911B. The needle 913 is an elongated tubular body and has an ink channel 913A. FIG. 6B shows the rightmost internal space 912 of the three internal spaces 912.

In FIG. 3, the cartridge case 91L has a configuration briefly substantially to that of the cartridge case 91R except three differences as follows. A first difference is that the cartridge case 91L is located farther leftward than the feed tray 21, the discharge tray 22, and the conveyance path 40 in the left-right direction X. A second difference is that the left end of the cartridge case 91L is at the same position as the left end of the movement range of the carriage 72 in the left-right direction X or a position slightly toward the center in the left-right direction X. A third difference is that one cartridge 92 is mounted on and accommodated in the internal space 912.

As shown in FIG. 4, the cartridge cases 91R and 91L are within the movement range 72*a* of the carriage 72 in the left-right direction X, and are located separately at both sides of the conveyance path 40 in the left-right direction X.

In FIGS. 1A and 1B, the front wall 12F is provided with a cover 14 for each cartridge case 91. The cover 14 includes a cover 14L and a cover 14R. In response to user's operation, the cover 14L is rotatable in a peripheral direction of a rotational axis 15L parallel to the left-right direction X between a first closed position of closing the opening of the cartridge case 91L (see FIG. 1A) and a first open position of opening this opening (see FIG. 1B). In response to user's operation, the cover 14R becomes rotatable in a peripheral direction of a rotational axis 15R parallel to the left-right direction X between a second closed position of closing the opening of the cartridge case 91R (see FIG. 1A) and a second open position of opening this opening (see FIG. 1B).

[Residual Amount Sensor 93]

In FIG. 6, the residual amount sensor 93 is a photo interrupter with a light-emitting element and a light-receiving element. One residual amount sensor 93 is attached to each internal space 912. Specifically, each residual amount sensor 93 is mounted on a base board 931 (see FIG. 6B) together with a peripheral circuit. The residual amount sensor 93 and the base board 931 constitutes an example of a first sensor. The base board 931 is attached to the top wall 911T of each internal space 912. With this configuration, the light-emitting element and the light-receiving element of each residual amount sensor 93 protrude downward from positions near the upper end of the internal space 912. The light-emitting element and the light-receiving element of each residual amount sensor 93 face each other while being spaced from each other in the left-right direction X. Each light-emitting element emits light toward the facing light-receiving element. The light-receiving element outputs a signal indicating a received light amount to the controller 99A. Specifically, if there is nothing to block an optical path between the light-emitting element and the light-receiving element, the light-receiving element outputs a high-level signal in response to receipt of the light from the light-emitting element. If there is something to block the optical path between the light-emitting element and the light-receiving element and thus the light from the light-emitting element is not received, the light-receiving element outputs a low-level signal.

[Cartridge 92 (An Example of an Ink Reservoir)]

In FIG. 1, the four cartridges 92 are an example of an ink reservoir and store ink to be supplied to the recording unit 70. For example, ink colors are yellow (Y), magenta (M), cyan (C), and black (K). In the embodiment, the cartridges 92 for colors Y, M, and C are mounted on the cartridge case 91R, and the cartridge 92 for the color K is mounted on the cartridge case 91L. In each of FIGS. 7 and 8, the cartridge 92 is illustrated in a posture of being mounted on the cartridge case 91. For the sake of convenience, the cartridge 92 in the mounted posture will be described.

Figure 7A:
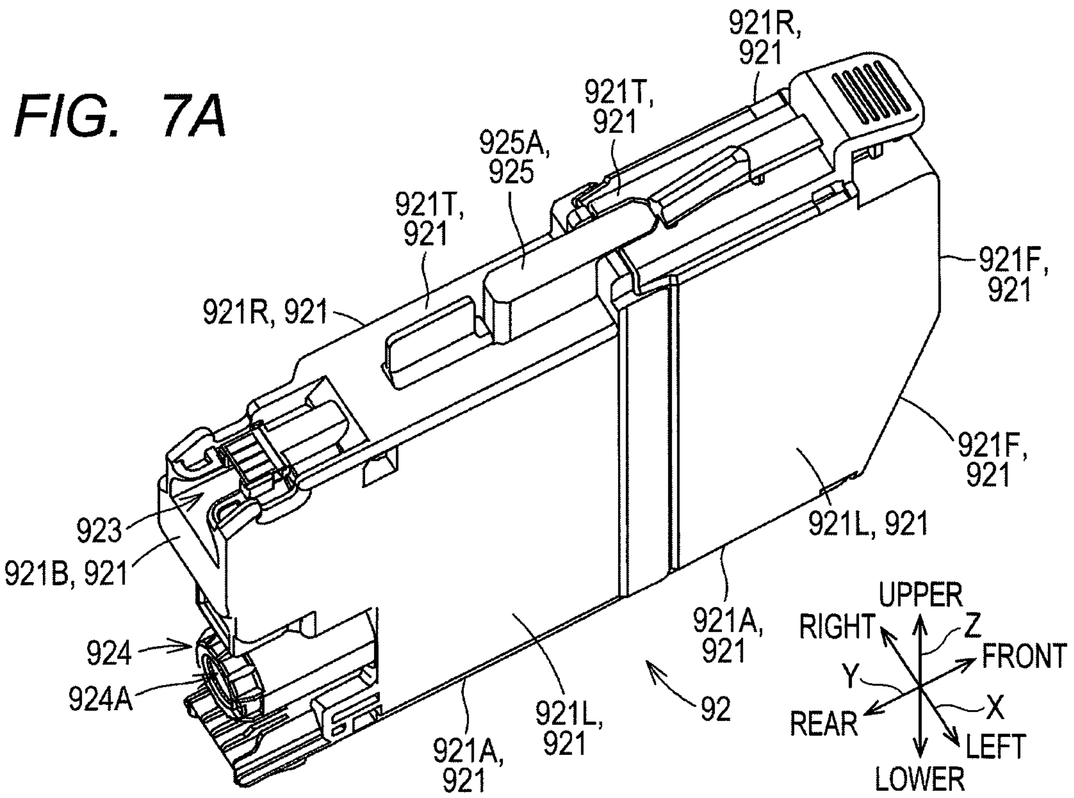
FIG. 7A is an external perspective view of a cartridge.
Figure 7B:
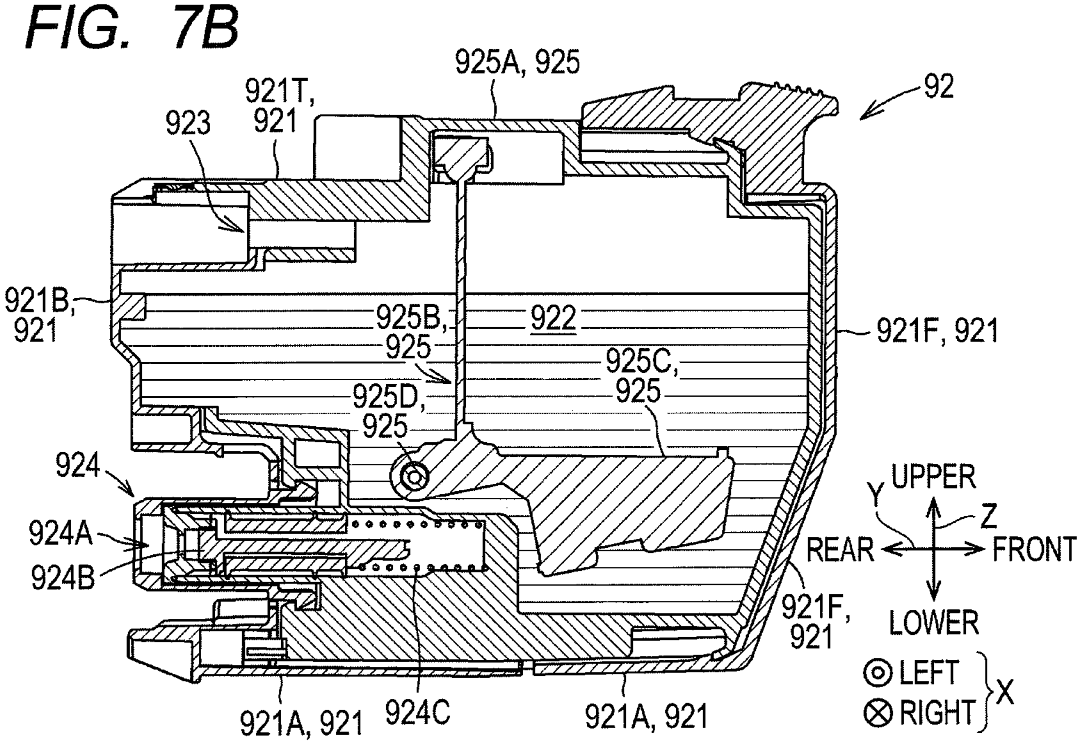
FIG. 7B is a cross-sectional view showing the internal configuration of the cartridge.

In FIGS. 7A, 7B, each cartridge 92 includes a plurality of outer walls 921, an ink reservoir 922 (see FIG. 7B), an atmosphere communication hole 923, an ink outlet portion 924, and a detected portion 925.

The plurality of outer walls 921 is made of a light-transmitting material such as transparent resin, for example, and separates the ink reservoir 922 from outside. The ink reservoir 922 stores ink. The plurality of outer walls 921 includes a bottom wall 921A, a top wall 921T, a front wall 921F, a rear wall 921B, a left wall 921L, and a right wall 921R.

The bottom wall 921A and the top wall 921T are separated from each other in the upper-lower direction Z, and extend in the front-rear direction Y and in the left-right direction X. The front wall 921F extends in the upper-lower direction Z and in the left-right direction X, and is continuous with the front end of each of the bottom wall 921A and the top wall 921T. The rear wall 921B extends in the upper-lower direction Z and in the left-right direction X, and is continuous with the rear end of each of the bottom wall 921A and the top wall 921T. The left wall 921L and the right wall 921R extend in the front-rear direction Y and in the upper-lower direction Z, and close a left side and a right side respectively of the ink reservoir 922.

In FIG. 7B, the atmosphere communication hole 923 is a hole formed near the upper end of the rear wall 921B and penetrating the rear wall 921B in the front-rear direction Y. When the cartridge 92 is mounted on the cartridge case 91 and ink in the ink reservoir 922 is sent out to the outside of the cartridge 92, outside air is introduced into the ink reservoir 922 through the atmosphere communication hole 923.

The ink outlet portion 924 guides the ink from the ink reservoir 922 to the outside of the cartridge 91 through a hole 924A formed near the lower end of the rear wall 921B. Specifically, in FIG. 7B, the ink outlet portion 924 includes a valve 924B. The valve 924B is movable between a third open position of opening the hole 924A (see FIG. 8) and a third closed position of closing the hole 924A (see FIG. 7B). The valve 924B is urged in the direction of closing the hole 924A by an urging member 924C such as a spring.

As shown in FIG. 6B, the cartridge 92 is moved rearward by a user through the opening of the corresponding internal space 912 and is mounted on the internal space 912. During this process, the needle 913 in the internal space 912 abuts on the corresponding valve 924B. The needle 913 applies forward force on the valve 924B which is the opposite direction to the urging force of the urging member 924C against this urging force. This moves the valve 924B from the third closed position (see FIG. 6B) to the third open position (see FIG. 8). As a result, the ink in the ink reservoir 922 is introduced to the outside of the cartridge 92 through the hole 924A in response to consumption of the ink by the recording unit 70.

In FIG. 3, the four cartridges 92 may be the same or different from each other in shape or size. Of the four cartridges 92, one or a plurality of cartridges 92 may be different in shape or size from the other cartridge 92. For example, the size in the left-right direction X of the cartridge 92 for K may be different from the sizes in the left-right direction X of the cartridges 92 for Y, M, and C.

[Detected Portion 925]

In FIGS. 7A, 7B, the detected portion 925 includes a protrusion 925A, a detected member 925B, and a float 925C.

Figure 8:
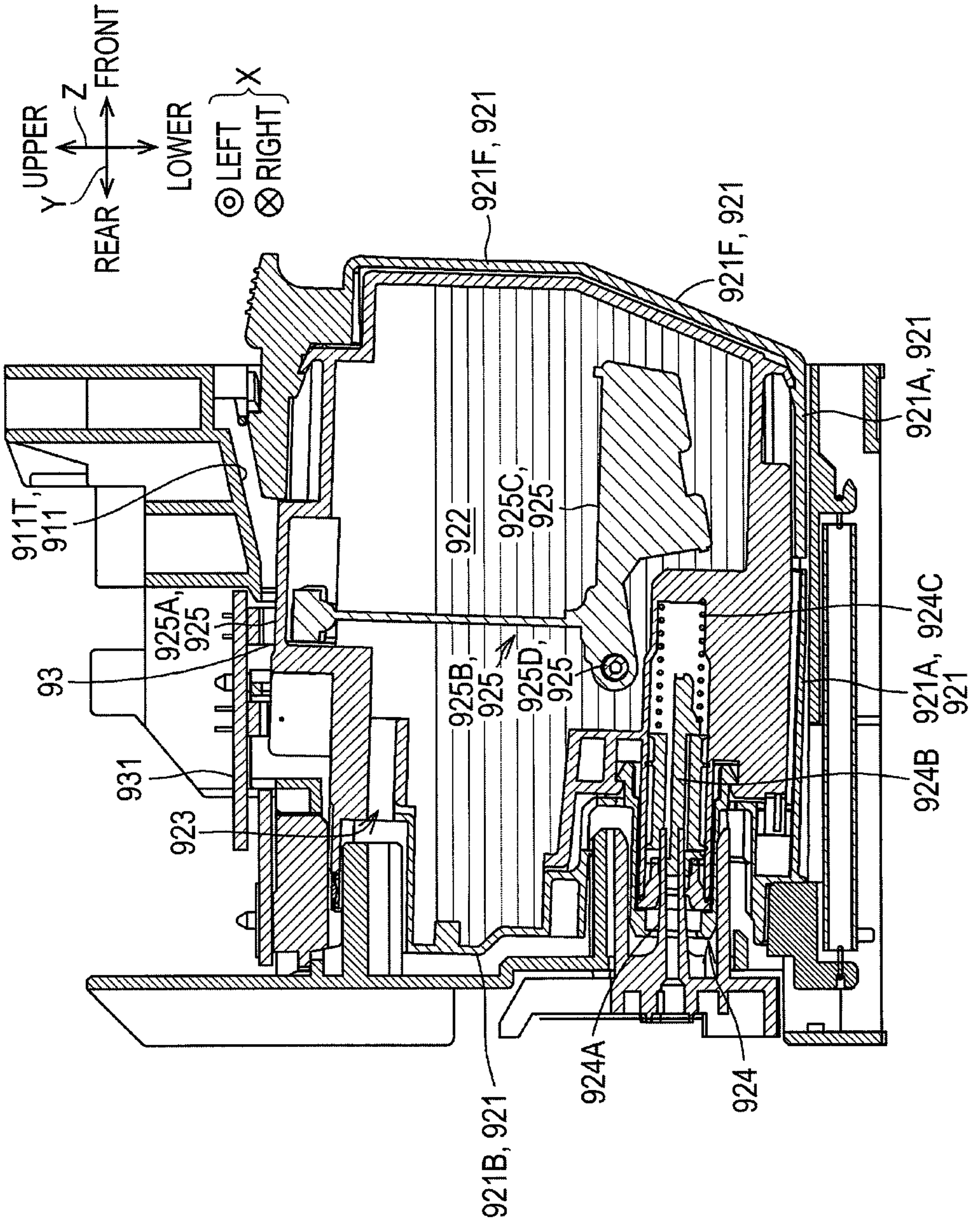
FIG. 8 is a cross-sectional view showing a cartridge case and the cartridge mounted on the cartridge case.

The protrusion 925A is integrally formed with the top wall 921T made of the light-transmitting material and protrudes upward from the top wall 921T. A space continuous with the ink reservoir 922 is formed in the protrusion 925A. In FIG. 8, when the cartridge 92 is mounted on the cartridge case 91, the protrusion 925A is located between the light-emitting element and the light-receiving element of the residual amount sensor 93. Namely, the residual amount sensor 93 is located above the ink reservoir 922 of the cartridge 92.

The detected member 925B is supported by a rotational shaft 925D extending in the left-right direction X at a lower position in the ink reservoir 922. The detected member 925B has an upper end portion placed inside the space in the protrusion 925A. The detected member 925B is pivotable in a peripheral direction of the rotational shaft 925D. The float 925C is attached to the lower end of the detected member 925B and has a smaller specific gravity than ink in the ink reservoir 922. This causes the float 925C to generate buoyant force in a state where the float 925C is in the ink in the ink reservoir 922.

In a state where the ink reservoir 922 is substantially filled with the ink, the buoyant force of the float 925C causes the upper end portion of the detected member 925B to pivot in the peripheral direction of the rotational shaft 925D in the counterclockwise direction of FIG. 7B. As a result, the upper end portion of the detected member 925B abuts on the rear wall of the protrusion 925A. Thus, the posture of the detected member 925B is maintained. In this state, the upper end portion of the detected member 925B blocks the optical path between the light-emitting element and the light-receiving element of the residual amount sensor 93.

As an ink liquid surface in the ink reservoir 922 drops, the position of the float 925C in the upper-lower direction Z also drops. This causes the upper end portion of the detected member 925B to pivot in the peripheral direction of the rotational shaft 925D in the clockwise direction of FIG. 7B. As a result, the upper end portion of the detected member 925B separates from the optical path between the light-emitting element and the light-receiving element of the residual amount sensor 93.

[Ink Tube 94 (An Example of an Ink Channel)]

In FIGS. 4 to 6B, one end of each of the four ink tubes 94 is connected to the rear side of corresponding one of the four needles 913. The other end of each of the four ink tubes 94 is connected to the recording unit 70. In response to mounting of the four cartridges 92 on the two cartridge cases 91, the four needles 913 are inserted into the holes 924A of the corresponding ink outlet portions 924. This forms an ink channel starting from the ink reservoir 922 of each cartridge 92 and defined continuously by the hole 924A, the ink channel 913A in the needle 913, and the ink tube 94. The ink stored in the ink reservoir 922 is supplied through this ink channel into the recording unit 70.

Specifically, as shown in FIG. 4, the three ink tubes 94 extend leftward from the rear sides of the corresponding three needles 913 of the cartridge case 91R (see FIG. 6B) toward the center of the housing 1 in the left-right direction X. The remaining one ink tube 94 extends rightward from the rear side of the needle 913 of the cartridge case 91L toward the center of the housing 1 in the left-right direction X. The four ink tubes 94 are bundled as four tubes at a fixing position P2 in the housing 1 and fixed to the housing 1. The position of the fixing position P2 in the front-rear direction Y is between the four cartridges 92 and the recording unit 70. The position of the fixing position P2 in the left-right direction X is near the center of the housing 1. The position of the fixing position P2 in the upper-lower direction Z is above the feed tray 21. The part of the four ink tubes 94 between the fixing position P2 and the recording unit 70 moves by following the movement of the carriage 72 in the left-right direction X.

[Internal Configuration of Housing 1 (Maintenance Unit 95, etc.)]

Figure 9:
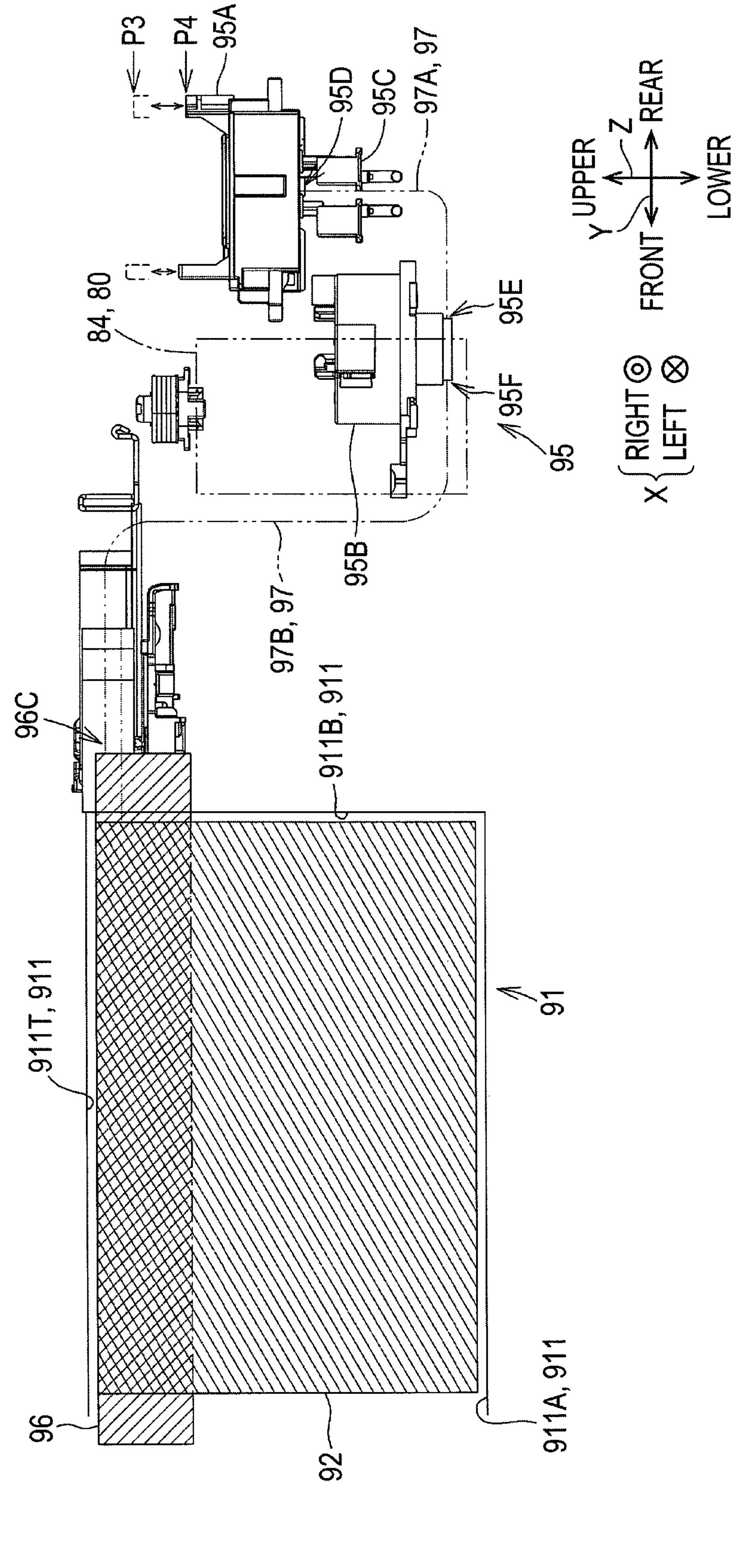
FIG. 9 is a schematic diagram showing a maintenance unit.

In FIGS. 5 and 9, a maintenance unit 95, the waste liquid unit 96, a waste liquid tube 97, and a waste liquid sensor 98 are located in the internal space 11.

The maintenance unit 95 is a purge mechanism that performs a purge of sucking and removing air bubbles or foreign matters together with ink through the ejection port 74 of the recording unit 70 under control by the controller 99A. The maintenance unit 95 includes the cap 95A, the pump 95B, and a lift 95C.

[Cap 95A]

The cap 95A is made of an elastic material such as rubber, and is configured to tightly contact the lower surface of the recording head 73 by the lift 95C to cover the plurality of ejection ports 74. The cap 95A has a bottom provided with an intake port 95D. One end of an upstream tube 97A is connected to the intake port 95D.

The cap 95A is arranged at a position within the movement range 72*a* of the carriage 72 and deviating rightward from the straight portion 42 of the conveyance path 40 in the left-right direction X, and below the capped position P1 (see FIG. 4). Specifically, the left end of the cap 95A is located farther rightward than the right end of a base board 99. The cap 95A is arranged at substantially the same position as the movement range 72*a* of the carriage 72 in the front-rear direction Y and is arranged below the carriage 72 in the upper-lower direction Z.

[Pump 95B]

In FIG. 5, the pump 95B is a rotary tube pump, for example. The pump 95B is located within the movement range 72*a* of the carriage 72 at a position farther leftward than the carriage motor 84 and farther rightward than the straight portion 42 in the left-right direction X. Specifically, like the left end of the cap 95A, the left end of the pump 95B is located farther rightward than the right end of the base board 99. In FIG. 9, the pump 95B is located at a position lower than the rail 81F (see FIG. 4) and higher than the bottom wall 911A of the cartridge case 91 in the upper-lower direction Z. The pump 95B is located farther forward than the cap 95A and farther rearward than the cartridge case 91 in the front-rear direction Y.

In FIG. 9, the pump 95B includes a suction port 95E and a discharge port 95F. The other end of the upstream tube 97A is connected to the suction port 95E. One end of a downstream tube 97B is connected to the discharge port 95F. The pump 95B communicates with the cap 95A through the upstream tube 97A. The pump 95B is driven under control by the controller 99A to push ink in the pump 95B from the discharge port 95F into the downstream tube 97B.

[Lift 95C]

In FIG. 9, the lift (up-down mechanism) 95C is provided within the movement range of the carriage 72 and at the same position as the cap 95A in the left-right direction X and in the front-rear direction Y. The lift 95C is located below the cap 95A in the upper-lower direction Z.

The cap 95A is movable in the upper-lower direction Z between a cap position P3 and a separate position P4 below the cap position P3. The cap position P3 is a position where the upper end of the cap 95A tightly contacts the lower surface of the recording unit 70 located at the capped position P1 to make the cap 95A cover the ejection port 74. The separate position P4 is a position where the upper end of the cap 95A is separated from the lower surface of the recording unit 70 located at the capped position P1. For example, the lift 95C may be a mechanism configured to move up the cap 95A to the cap position P3 by using power from a motor after the carriage 72 moves to the capped position P1 (FIG. 4). However, this is not the only mechanism of the lift 95C but another known mechanism may be used.

As described above, the range occupied by the maintenance unit 95 in the left-right direction X overlaps the movement range of the carriage 72 in the left-right direction X.

[Outline of Operation of Maintenance Unit 95]

When the timing of executing the purge comes, the carriage conveyance mechanism 80 moves the carriage 72 to the capped position P1. The lift 95C moves the cap 95A to the cap position P3. Then, the pump 95B is driven to reduce pressure in the cap 95A in tight contact with the recording unit 70 to discharge ink as waste liquid from the recording unit 70 into the cap 95A. The waste liquid flows into the upstream tube 97A through the intake port 95D of the cap 95A and flows from the pump 95B into the waste liquid unit 96 through the downstream tube 97B. The waste liquid is stored in the waste liquid unit 96.

[Waste Liquid Unit 96]

In FIGS. 3 to 5, the waste liquid unit 96 stores ink discharged from the recording unit 70 by the operation of the maintenance unit 95.

Figure 10A:
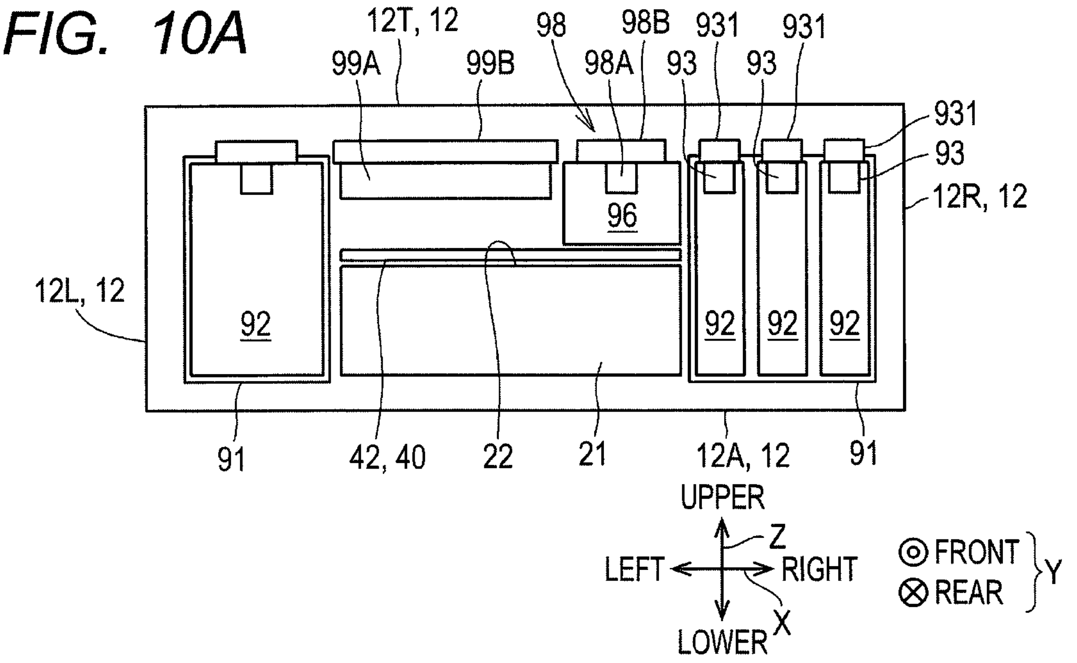
FIG. 10A is a schematic diagram showing the positional relationship between a base board, a residual amount sensor, and a waste liquid sensor.

The waste liquid unit 96 is located within a range from the left end of the cartridge case 91R to the right end of the base board 99 described later in the left-right direction X. Namely, the right end position of the waste liquid unit 96 is farther leftward than the left end position of the cartridge case 91R. Like the maintenance unit 95, the left end position of the waste liquid unit 96 is farther rightward than the right end position of the base board 99. In FIGS. 3 and 4, the waste liquid unit 96 is located within a range from a position immediately at the rear of the front wall 12F to the front end of the rail 81F in the front-rear direction Y. As shown in FIG. 3, the recording unit 70 and the maintenance unit 95 are located farther rearward than the waste liquid unit 96. Namely, the front end position of each of the recording unit 70 and the maintenance unit 95 is located farther rearward than the rear end position of the waste liquid unit 96. As shown in FIG. 10A, the waste liquid unit 96 is located within a range between the straight portion 42 of the conveyance path 40 and the top wall 12T in the upper-lower direction Z. Namely, the waste liquid unit 96 is located above the conveyance path 40.

As shown in FIG. 9, a range occupied by the waste liquid unit 96 overlaps a range occupied by the cartridge case 91 in each of the front-rear direction Y and the upper-lower direction Z.

In FIG. 4, the waste liquid unit 96 includes a substantially rectangular case 96A in a plan view and an ink absorbing member 96B attached to the interior of the case 96A. The case 96A is a box made of resin, for example, and having an opened top. The ink absorbing member 96B is made of a porous and electrically-insulating material such as foamed polyurethane, and absorbs ink.

[Waste Liquid Tube 97 (An Example of a Waste Liquid Channel)]

In FIG. 9, the waste liquid tube 97 includes the upstream tube 97A and the downstream tube 97B. The one end and the other end of the upstream tube 97A are connected to the intake port 95D of the cap 95A and to the suction port 95E of the pump 95B respectively. The one end of the downstream tube 97B is connected to the discharge port 95F of the pump 95B. The other end of the downstream tube 97B is connected to a connection portion 96C provided at the rear end of the case 96A. In FIG. 5, at a position slightly farther rearward than the connection portion 96C, the downstream tube 97B intersects three-dimensionally with the ink tube 94 extending from the cartridge case 91R in the upper-lower direction Z.

[Waste Liquid Sensor 98 (An Example of a Second Sensor)]

In FIG. 3, the waste liquid sensor 98 is an example of a second sensor. The waste liquid sensor 98 includes a plurality of electrodes 98A and a base board 98B. The plurality of electrodes 98A is in contact with a front end portion of the ink absorbing member 96B from above the ink absorbing member 96B. The front end portion is a concept including the front end and the vicinity of the front end of the ink absorbing member 96B. Like the waste liquid unit 96, the waste liquid sensor 98 is located within a range from the left end of the cartridge case 91R to the right end of the base board 99 described later in the left-right direction X.

The plurality of electrodes 98A is mounted together with a peripheral circuit (not shown) on the base board 98B. In response to arrival of ink at the plurality of electrodes 98A, the waste liquid sensor 98 outputs a high-level signal to the controller 99A. When the ink does not arrive at the plurality of electrodes 98A, the waste liquid sensor 98 outputs a low-level signal to the controller 99A.

[Base Board 99 (An Example of a Base Board)]

In FIGS. 3 to 5, the base board 99 is located in the internal space 11. The base board 99 includes a board 99B and the controller 99A. The controller 99A for controlling each part of the printer 100 is mounted on the board 99B. Various types of electronic parts forming the controller 99A include a CPU, a ROM, a RAM, an EEPROM, an ASIC, and a connector. These electronic parts are connected to each other through inner buses or wiring lines formed on the base board, for example.

The base board 99 is located within a range from the left end of the waste liquid unit 96 to the right end of the cartridge case 91L in the left-right direction X. In other words, the right end position of the base board 99 is farther leftward than the left end position of the waste liquid unit 96, and the left end position of the base board 99 is farther rightward than the right end of the cartridge case 91L. The base board 99 is located within a range from a position immediately rearward of the front wall 12F to the fixing position P2 in the front-rear direction Y. Namely, the entirety of the base board 99 is located farther forward than the fixing position P2. The base board 99 is located within a range between the straight portion 42 of the conveyance path 40 and the top wall 12T in the upper-lower direction Z. Specifically, the entirety of the base board 99 is located above the conveyance path 40, and the lower end of the base board 99 is not located below the upper end of the conveyance path 40.

As shown in FIG. 10A, the range occupied by the base board 99 in the upper-lower direction Z overlaps each of the range occupied by the residual amount sensor 93 in the upper-lower direction Z and the range occupied by the waste liquid sensor 98 in the upper-lower direction Z. Specifically, the vertical position (the position in the upper-lower direction Z) of a surface of the base board 99 for mounting the controller 99A, the vertical position of a surface of the base board 931 for mounting the residual amount sensor 93, and the vertical position of a surface of the base board 98B for mounting the electrode 98A are all aligned with each other. At this position, the base board 99 extends in the front-rear direction Y and in the left-right direction X.

As shown in FIG. 3, the base board 99 is located farther forward than the recording unit 70 and is located farther leftward than the maintenance unit 95 and the waste liquid unit 96. Specifically, the rear end of the base board 99 is located farther forward than the front end of the recording unit 70. The right end of the base board 99 is located farther leftward than the left end of each of the maintenance unit 95 and the waste liquid unit 96.

The controller 99A receives an output signal from the residual amount sensor 93 and an output signal from the waste liquid sensor 98. In response to a change of the output signal from the residual amount sensor 93 from a low level to a high level, the controller 99A displays a screen for encouraging replacement of the corresponding cartridge 92 on the display. In response to a change of the output signal from the waste liquid sensor 98 from a low level to a high level, the controller 99A displays a screen for encouraging replacement of the waste liquid unit 96 on the display.

[Operation and Effects of the Embodiment]

In the embodiment, the base board 99 extends in the front-rear direction Y and in the left-right direction X, and the range occupied by the base board 99 in the vertical direction Z overlaps each of the range occupied by the residual amount sensor 93 in the vertical direction Z and the range occupied by the waste liquid sensor 98 in the vertical direction Z. Thus, the vertical distance from the controller 99A to each of the residual amount sensor 93 and the waste liquid sensor 98 are shortened, and the controller 99A and each of the residual amount sensor 93 and the waste liquid sensor 98 is connected by a shorter signal line. As a result, the space in the housing 1 is effectively used, so that the printer 100 is downsized.

In the embodiment, the recording unit 70 and the maintenance unit 95 are located farther rearward than the waste liquid unit 96. The base board 99 and each cartridge case 91 are located farther forward than the recording unit 70. The waste liquid sensor 98 is located at the front end or near the front end of the waste liquid unit 96. With this configuration, compared with a case where the waste liquid sensor 98 is located near the rear end of the waste liquid unit 96, the distance from the maintenance unit 95 to the waste liquid unit 96 in the front-rear direction Y is shorter, and the maintenance unit 95 and the waste liquid unit 96 are connected by a shorter waste liquid tube 97.

In the embodiment, as shown in FIG. 2, the straight portion 42 of the conveyance path 40 of the sheet S extends along the front-rear direction Y, and the recording unit 70 is located above the conveyance path 40 in the vertical direction Z. As shown in FIG. 10A, the waste liquid unit 96 and the base board 99 are laid out in a space forward of the recording unit 70 and above the discharge tray 22 in the internal space 11. That is, the waste liquid unit 96 and the base board 99 are located above the conveyance path 40 in the vertical direction Z so as not to hinder the discharge of a printed sheet. In this way, in the embodiment, since the space forward of the recording unit 70 is effectively used, the sizes of the printer 100 in the front-rear direction and in the left-right direction are reduced.

In the embodiment, the cartridge cases 91L and 91R are located within the movement range of the carriage 72 in the left-right direction X, and are separately located at the left and right sides of the conveyance path 40 of the sheet S. Thus, the dimension of the printer 100 in the left-right direction is reduced.

In the embodiment, the maintenance unit 95 and the waste liquid unit 96 are located at the same side in the left-right direction X (specifically, to the right) with respect to the base board 99. This allows the maintenance unit 95 and the waste liquid unit 96 to be connected with a shorter waste liquid tube 97. The waste liquid sensor 98 is located between the base board 99 and the cartridge case 91R in the left-right direction X. Thus, the controller 99A and the waste liquid sensor 98 are connected by a shorter signal line.

In the embodiment, the range occupied by each cartridge case 91 in the front-rear direction Y and the vertical direction Z overlaps the range occupied by the waste liquid unit 96 in the front-rear direction Y and the vertical direction Z. More specifically, the range occupied by each cartridge case 91 in the front-rear direction Y overlaps the range occupied by the waste liquid unit 96 in the front-rear direction Y. Further, the range occupied by each cartridge case 91 in the vertical direction Z overlaps the range occupied by the waste liquid unit 96 in the vertical direction Z. Further, each residual amount sensor 93 and the waste liquid sensor 98 are located at the upper part of each cartridge 92 and the waste liquid unit 96, respectively. With this configuration, the dimension of the printer 100 in the front-rear direction Y is reduced.

[Modifications]

While the disclosure has been described in detail with reference to the above aspects thereof, it would be apparent to those skilled in the art that various changes and modifications may be made therein without departing from the scope of the claims.

Figure 10B:
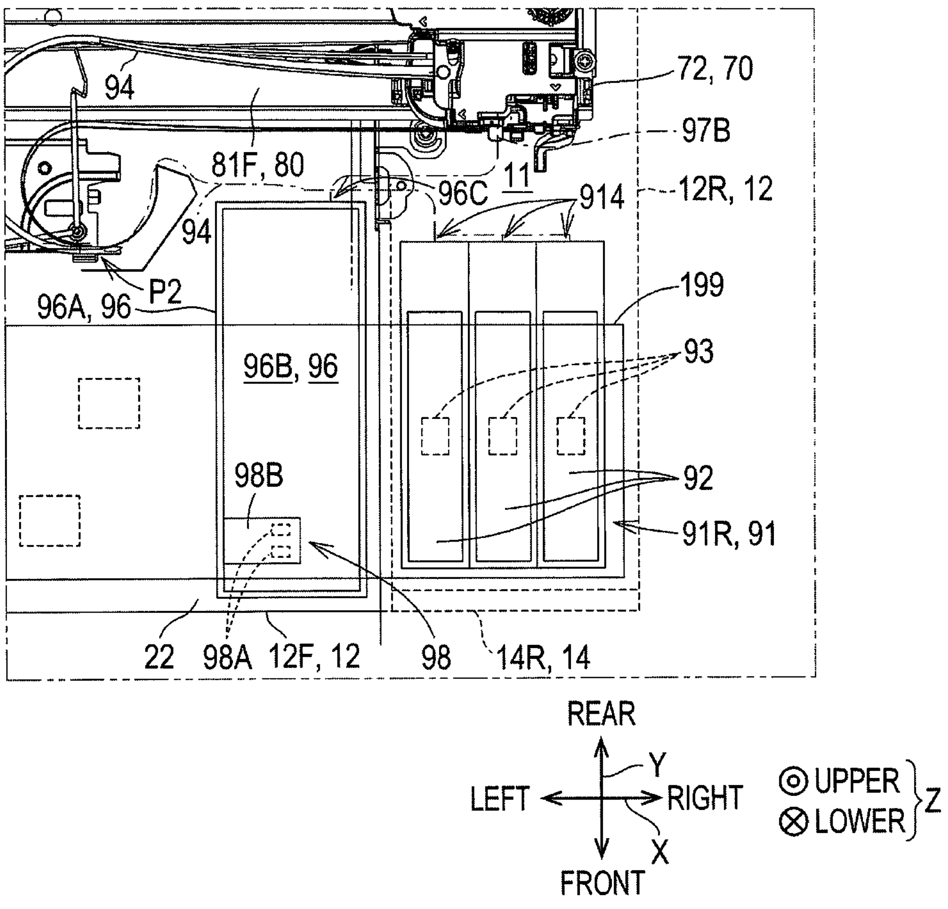
FIG. 10B is a schematic diagram showing a base board.

In the embodiment, the residual amount sensor 93 and the waste liquid sensor 98 are mounted on the base board 931 and the base board 98B different from the board 99B. Alternatively, as shown in FIG. 10B, the residual amount sensor 93 and the waste liquid sensor 98 may be mounted on a board 199 together with the controller 99A. This configuration reduces the time for removing the residual amount sensor 93, the waste liquid sensor 98 and the controller 99A at the time of repair or maintenance of the printer 100. In this modification, the shape of the board 199 in a plan view may be a rectangle, or may be a deformed shape such as a T-shape or an inverted T-shape.

In the embodiment, the waste liquid unit 96 and the base board 99 are located above the conveyance path 40. However, at least one of the waste liquid unit 96 and the base board 99 may be located above the conveyance path 40.

In the embodiment, in the internal space 11, two cartridge cases 91L and 91R are separately arranged at both sides of the supply tray 21 in the left-right direction X. Alternatively, a single cartridge case 91 may be arranged at one side of the supply tray 21 in the left-right direction X. In a case where the printer 100 supports full-color printing, the single cartridge case 91 may accommodate four cartridges 92. In a case where the printer 100 supports only monochrome printing, the single cartridge case 91 may accommodate one cartridge 92.

In the embodiment, each of the maintenance unit 95 and the waste liquid unit 96 is located at the right side of the base board 99. Alternatively, each of the maintenance unit 95 and the waste liquid unit 96 may be located at the left side of the base board 99.

In the embodiment, each residual amount sensor 93 and the waste liquid sensor 98 are located at the upper side of each cartridge 92 and the waste liquid unit 96. Alternatively, each residual amount sensor 93 and the waste liquid sensor 98 may be located at a side other than the upper side (for example, the front side) of each cartridge 92 or the waste liquid unit 96.

In the embodiment, the waste liquid unit 96 is connected to the pump 95B constituting the purge mechanism by the downstream tube 97B. Alternatively, the waste liquid unit 96 may be connected to an ink receiver used for so-called flushing by another waste liquid tube. That is, the maintenance unit may be the ink receiver used for the flushing. The ink receiver receives ink discharged from the recording head 73 during the flushing.

In the embodiment, as an example of the ink container, the cartridge 92 attachable to and detachable from the cartridge case 91 has been described. Alternatively, the ink container may be an ink tank installed in an accommodating body (case) in the housing 1.

In the embodiment, the residual amount sensor 93 detects the position of the detected portion 925 having the float 925C by the photo interrupter. However, the residual amount sensor 93 is not limited to this, and a known liquid level sensor may be used.

In the embodiment, the conveyance path 40 has the curved portion 41 extending from the lower side toward the upper side in the internal space 11 while protruding rearward and the straight portion 42 extending forward from the downstream end of the curved portion 41. Alternatively, the conveyance path 40 may have a curved portion extending from the lower side toward the upper side in the internal space 11 while protruding rightward and a straight portion extending leftward from the downstream end of the curved portion.

In the embodiment, the left and right ends of the waste liquid unit 96 are located inside the left and right ends of the conveyance path 40 in the left-right direction. Alternatively, one of the left and right ends of the waste liquid unit 96 may be located outside one of the left and right ends of the conveyance path 40 in the left-right direction.

In the embodiment, the shape of the waste liquid unit 96 in a plan view is a rectangle which is long in the front-rear direction Y. Alternatively, the shape of the waste liquid unit 96 in a plan view may be a deformed shape such as an inverted L-shape or an inverted T-shape.

Figure 11:
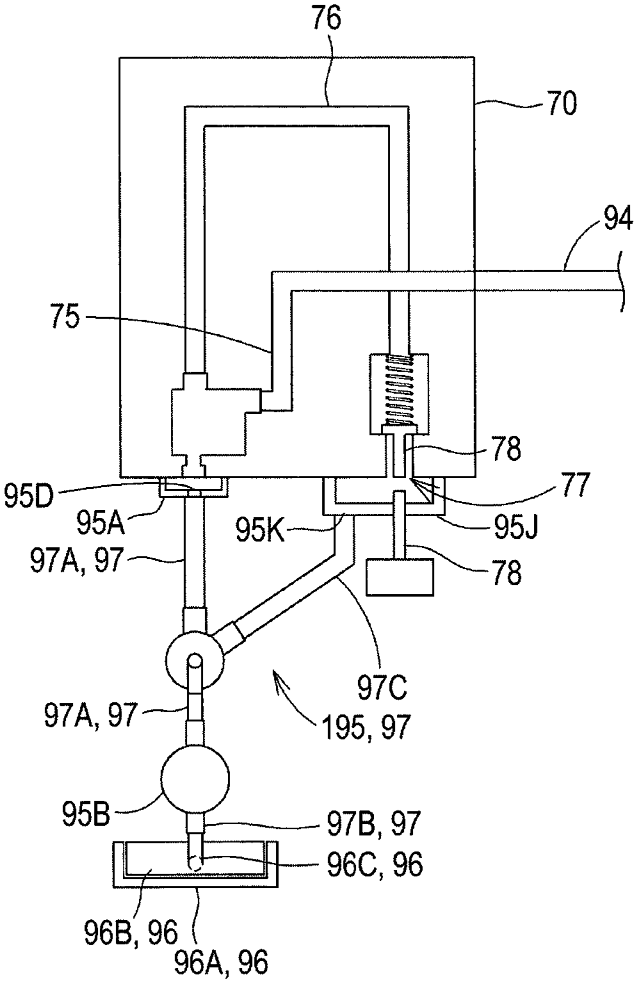
FIG. 11 is a schematic diagram showing the configuration of a maintenance unit.

In an embodiment, the maintenance unit 95 is configured to perform a suction purge that ejects ink in the recording unit 70 from the ejection port 74 to the cap 75A and sends the ink to the waste liquid unit 96. Alternatively, a maintenance unit 195 may be configured to perform a discharge purge. In this case, as shown in FIG. 11, the recording unit 70 is formed with a discharge channel 76 branched from the ink channel 75. The discharge channel 76 has a discharge port 77 (another example of the ejection port) at the lower surface of the recording unit 70. The recording unit 70 is provided with a discharge valve 78 that opens and closes the discharge port 77. In FIG. 11, the maintenance unit 195 has a discharge cap 95J that covers the discharge port 77, in addition to the cap 95A. A discharge port 95K is formed at the bottom of the discharge cap 95J. One end of a discharge tube 97C is connected to the discharge port 95K. The other end of the discharge tube 97C joins the upstream tube 97A.

What is claimed is:

1. An inkjet recording apparatus comprising:

a housing having an internal space, the housing having one end and an other end in a first horizontal direction, the housing has a discharge opening for discharging a sheet, the discharge opening being formed at the one end of the housing in the first horizontal direction;

a recording head having an ejection port configured to eject ink;

a case configured to accommodate an ink container storing ink to be supplied to the recording head;

a first sensor configured to detect ink stored in the ink container;

a maintenance unit configured to cause the recording head to discharge ink from the ejection port;

a waste liquid container configured to store ink discharged by the maintenance unit;

a second sensor configured to detect ink in the waste liquid container; and a base board including a board and a controller mounted on the board, the controller being configured to receive signals outputted from the first sensor and the second sensor, the recording head, the case, the first sensor, the maintenance unit, the waste liquid container, the second sensor, and the base board being arranged in the internal space of the housing, the base board having a flat surface extending in the first horizontal direction and in a second horizontal direction, a range occupied by the base board in a vertical direction overlapping each of a range occupied by the first sensor in the vertical direction and a range occupied by the second sensor in the vertical direction, the second horizontal direction being perpendicular to the first horizontal direction, the vertical direction being perpendicular to both the first horizontal direction and the second horizontal direction, and the case being aligned with the discharge opening in the second horizontal direction, the waste liquid container and the base board being located above the discharge opening in the vertical direction, the waste liquid container and the base board overlapping the discharge opening as viewed in the vertical direction.

2. The inkjet recording apparatus according to claim 1, wherein the recording head and the maintenance unit are located closer to the other end than the waste liquid container is in the first horizontal direction;

wherein the base board and the case are located closer to the one end than the recording head is in the first horizontal direction; and wherein the second sensor is located at a first end of the waste liquid container, the first end of the waste liquid container being an end closer to the one end in the first horizontal direction.

3. The inkjet recording apparatus according to claim 2, further comprising a waste liquid tube having an upstream end and a downstream end, the upstream end of the waste liquid tube being connected to the maintenance unit, the downstream end of the waste liquid tube being connected to a second end of the waste liquid container, the second end of the waste liquid container being an end closer to the other end of the housing in the first horizontal direction.

4. The inkjet recording apparatus according to claim 1, wherein a conveyance path of the sheet is formed in the internal space of the housing, at least part of the conveyance path extending along the first horizontal direction;

wherein the recording head is located above the conveyance path; and wherein at least the waste liquid container or the base board is located above the conveyance path in the vertical direction.

5. The inkjet recording apparatus according to claim 1, further comprising a carriage on which the recording head is mounted, wherein the carriage is configured to move along the second horizontal direction in the internal space of the housing;

wherein the case includes a plurality of cases;

wherein the plurality of cases is located closer to the one end than the recording head is in the first horizontal direction; and wherein the plurality of cases is located within a movement range of the carriage in the second horizontal direction, the plurality of cases being separated at both sides of a conveyance path of the sheet in the second horizontal direction.

6. The inkjet recording apparatus according to claim 5, wherein a range occupied by the maintenance unit in the second horizontal direction overlaps the movement range of the carriage in the second horizontal direction;

wherein the maintenance unit and the waste liquid container are located at a same side with respect to the base board in the second horizontal direction; and wherein the second sensor is located between the base board and one of the plurality of cases in the second horizontal direction.

7. The inkjet recording apparatus according to claim 1, wherein a range occupied by the case in the first horizontal direction overlaps a range occupied by the waste liquid container in the first horizontal direction;

wherein a range occupied by the case in the vertical direction overlaps a range occupied by the waste liquid container in the vertical direction;

wherein the first sensor is located above the case; and wherein the second sensor is located above the waste liquid container.

8. An inkjet recording apparatus comprising:

a housing having an internal space;

a recording head having an ejection port configured to eject ink;

a case configured to accommodate an ink container storing ink to be supplied to the recording head;

a first sensor configured to detect ink stored in the ink container;

a maintenance unit configured to cause the recording head to discharge ink from the ejection port;

a waste liquid container configured to store ink discharged by the maintenance unit;

a second sensor configured to detect ink in the waste liquid container; and a base board including a board and a controller mounted on the board, the controller being configured to receive signals outputted from the first sensor and the second sensor, the recording head, the case, the first sensor, the maintenance unit, the waste liquid container, the second sensor, and the base board being arranged in the internal space of the housing, the base board having a flat surface extending in a first horizontal direction and in a second horizontal direction, a range occupied by the base board in a vertical direction overlapping each of a range occupied by the first sensor in the vertical direction and a range occupied by the second sensor in the vertical direction, the second horizontal direction being perpendicular to the first horizontal direction, the vertical direction being perpendicular to both the first horizontal direction and the second horizontal direction, wherein the first sensor and the second sensor are mounted on the board.

9. The inkjet recording apparatus according to claim 1, wherein the maintenance unit is configured to perform purge, the maintenance unit including:

a cap configured to cover the ejection port of the recording head;

a lift configured to move the cap up and down; and a pump configured to send ink received by the cap toward the waste liquid container.

10. The inkjet recording apparatus according to claim 1, wherein the maintenance unit includes an ink receiver configured to receive ink discharged from the recording head during flushing.

11. The inkjet recording apparatus according to claim 1, wherein the waste liquid container includes a waste-liquid-container case and an ink absorbing member attached in the waste-liquid-container case; and wherein the second sensor includes a plurality of electrodes in contact with the ink absorbing member.

* * * * *